April 7, 1925.
C. V. BIXLER
RADIATOR
Filed May 11, 1923
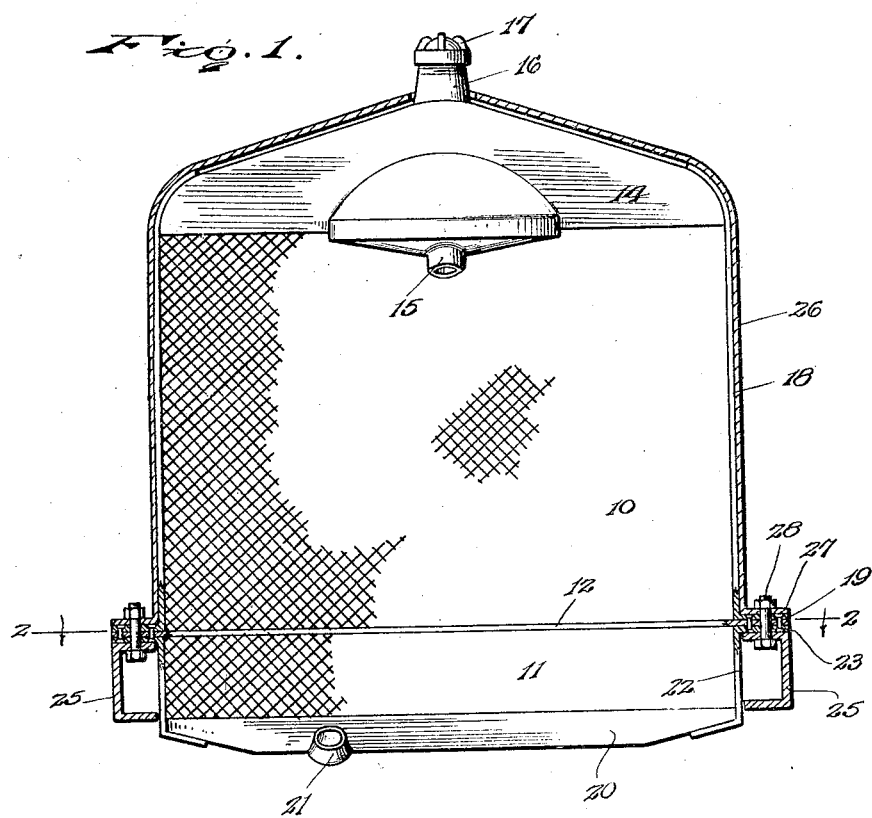
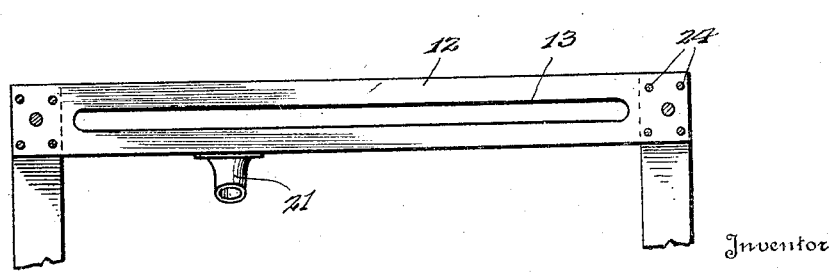
Inventor
C. V. Bixler.
By Lacey & Lacey, Attorneys Patented Apr. 7, 1925.

1,532,727

UNITED STATES PATENT OFFICE.

CLAUDE V. BIXLER, OF FRANKFORT, KENTUCKY.

RADIATOR.

Application filed May 11, 1923. Serial No. 638,333.

*To all whom it may concern:*

Be it known that I, CLAUDE V. BIXLER, a citizen of the United States, residing at Frankfort, in the county of Franklin and State of Kentucky, have invented certain new and useful Improvements in Radiators, of which the following is a specification.

This invention relates to an improved cellular radiator for vehicle motors and seeks, among other objects, to provide a cellular radiator embodying a horizontal cross brace.

The invention seeks, as a further object, to provide a cellular radiator particularly adapted for use in connection with Ford vehicles and wherein the cross brace of the radiator will be available for use as a tie bar connecting the forward ends of the side bars of the vehicle chassis.

And the invention seeks, as a still further object, to provide a radiator which may be readily installed in lieu of the ordinary Ford radiator.

Other and incidental objects will appear hereinafter.

In the drawings:

Figure 1 is a rear elevation of my improved radiator, parts being shown in section, and Figure 2 is a horizontal sectional view on the line 2—2 of Figure 1, looking in the direction of the arrows.

As is well known, the cellular or honeycomb type of radiator is often conceded to be superior to the radiator of tubular type and, as a consequence, it is frequently desired to replace the tubular radiator of a Ford vehicle by a cellular radiator. However, it has heretofore been found impractical to embody a cross brace in a radiator of cellular type and since the presence of such a cross brace is necessary in conjunction with the radiator in order to relieve the radiator of the strain which would otherwise be communicated from the vehicle chassis, it has heretofore proven a vexing problem to employ a cellular radiator and, at the same time, provide for the mounting thereof in such a way as to protect the radiator core from strain. Experience has proven that the front cross bar of the chassis frame of a Ford vehicle is insufficient to prevent spreading of the side bars of the frame under the weight of the engine and, for this reason, the ordinary radiator of a Ford vehicle embodies a cross brace which extends through the radiator core and is bolted at its ends to the side bars of the frame, thus rigidly connecting said side bars with each other and functioning auxiliary to the front bar of the frame for preventing spreading of the side bars. The present invention, therefore, seeks to embody a similar cross brace in a cellular radiator so that the cellular radiator may be readily mounted upon a Ford vehicle and adequately protected against strain from the side bars of the vehicle frame.

In carrying the invention into effect, I form the cellular core of the radiator of top and bottom sections 10 and 11 and interposed between the sections is a horizontal cross brace 12, the end of which project at the side edges of the core. The top section 10 is soldered to the top face of the brace while the bottom section 11 is soldered to the bottom face of the brace in alinement with the top section, and formed in the brace throughout the major portion of its length, is, as shown in Figure 2, a longitudinal medially directed slot or opening 13 establishing communication between the sections of the core so that water may freely flow downwardly from the section 10 through said slot into the section 11. Connected to the top section 10 at its upper end is a top tank 14 having an inlet 15 and provided with a filler beck 16 normally closed by a cap 17. Secured at their upper ends to the ends of the top tank are side braces 18 which extend downwardly at the edges of the section 10 of the core and are provided at their lower extremities with laterally directed flanges 19 seating flat against the ends of the cross brace 12 registering therewith. Secured to the lower end of the bottom section 11 is a bottom tank 20 provided with an outlet 21 and secured to the ends of said tank are brackets 22 extending upwardly at the side edges of the core section 11. At their upper ends, the brackets are formed with laterally directed flanges 23 seating flat against the ends of the brace 12 therebeneath registering with said brace and extending through said flanges, the ends of the brace, and through the flanges 19 of the braces 18, are rivets 24 connecting the braces 18 and brackets 22 with the cross brace, rigidly holding the sections of the core in assembled relation. As shown in Figure 1, the core is of a width to fit between the usual side bars 25 of the chassis frame of a Ford vehicle so that, as brought out in Figure 1, the flanges 23 of the brackets 22 will engage over said side bars for supporting the radiator thereon, and fitting around the core above the side bars is a shell 26 provided at its lower ends with flanges 27 seating flat against the flanges 19 of the braces 18. Extending through the top flanges of the side bars 25 and through the flanges 19, 23 and 27 as well as through the ends of the brace 12, are bolts 28 connecting the radiator with said side bars, said flanges as well as said brace being apertured to removably receive the bolts. Thus, the bolts will not only function to mount the radiator but will also serve to rigidly connect the brace 12 with the side bars of the chassis frame of the vehicle so that said brace will act as a tie bar connecting said side bars with each other to prevent spreading thereof. Strain upon the radiator which would be caused by such spreading will accordingly be effectually prevented

Having thus described the invention, what is claimed as new is:

In a radiator for vehicle motors, the combination of a cross plate having an opening therein, a core section rigidly fixed to one side of the plate, and a complemental core section rigidly fixed to the opposite side of the plate to communicate with said first mentioned section through said opening, the plate forming a permanent connecting element between the core sections rigidly uniting said sections to form a core having the plate projecting at the side edges thereof and braced both transversely and longitudinally by the plate.

In testimony whereof I affix my signature.

CLAUDE V. BIXLER. [L. S.]